No. 732,780. PATENTED JULY 7, 1903.
F. N. PRINCE.
ATTACHMENT FOR CAN SOLDERING MACHINES.
APPLICATION FILED APR. 8, 1903.

NO MODEL.

Witnesses:
Wm. T. Brewer.
H. E. Chase.

Inventor
Frank N. Prince

By Howard P. Denison
Attorney

No. 732,780.                                                    Patented July 7, 1903.

UNITED STATES PATENT OFFICE.

FRANK N. PRINCE, OF FULTON, NEW YORK.

ATTACHMENT FOR CAN-SOLDERING MACHINES.

SPECIFICATION forming part of Letters Patent No. 732,780, dated July 7, 1903.

Application filed April 8, 1903. Serial No. 151,581. (No model.)

*To all whom it may concern:*

Be it known that I, FRANK N. PRINCE, of Fulton, in the county of Oswego, in the State of New York, have invented new and useful Improvements in Attachments for Can-Soldering Machines, of which the following, taken in connection with the accompanying drawings, is a full, clear, and exact description.
This invention relates to an attachment for can-soldering machines in which the can is mounted on a revolving support, so as to rotate on its own axis relatively to the soldering-iron for soldering the caps to the cans.
The object sought is to provide a simple and practical device for automatically alining the soldering-tool with the periphery or rim of the cap when the same is being applied to the can and to render the stop or gage adjustable for various sizes of cans.

Another object is to provide for the vertical adjustment of the soldering-iron, so as to accommodate the device to various heights of cans.
Further objects will appear in the subsequent description.

Figure 1:
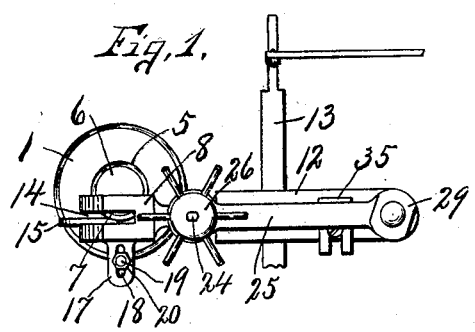
Figure 2:
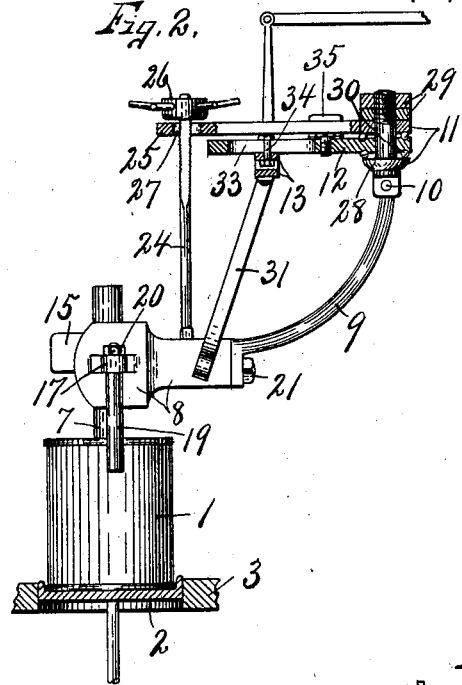
Figure 3:
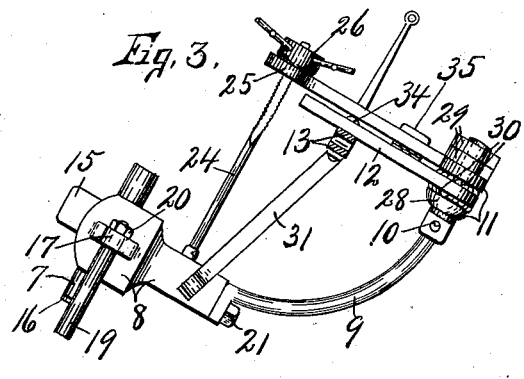
Figure 4:
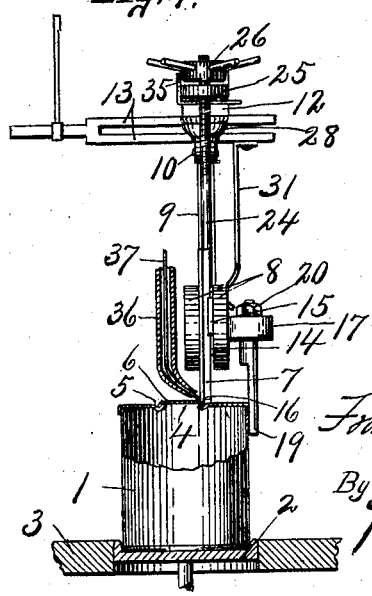

In the drawings, Figures 1, 2, and 3 are respectively top, plan, and similar face views of my improved attachment for soldering-machines, the same being shown in its operative position in Figs. 1 and 2 and is rocked upwardly away from the can in Fig. 3, portions of the device in Fig. 2 being shown in section. Fig. 4 is an end view of the same device as seen in Figs. 1 and 2.

Similar reference characters indicate corresponding parts in all the views.

In devices of this character it is customary to elevate the soldering-tool and its holding mechanism to permit the can to ride under the soldering-tool and to then depress said tool and its holding mechanism onto the upper portion of the can for soldering the cap thereto.

The broad idea of raising and lowering a soldering-tool is concededly old, as is also the rotation of the can relatively to the soldering-iron. Therefore I do not claim any particular means for rotating the can. Neither do I claim, broadly, the means for moving the soldering-tool toward and away from the can; but what I believe to be new is to provide a stop for engaging the lateral side of the can for the purpose of positively registering the soldering edge of the tool with the periphery of the cap which is to be affixed to the can, and I also believe that the vertical adjustment of the soldering-tool support, particularly as set forth in the drawings, is also new in this art aside from the mechanism which raises and lowers the soldering mechanism to permit the can to pass under the same.

In order to demonstrate the utility of my invention, I have shown a can 1 as mounted upon a revoluble support 2, which is shown as guided in an opening in a table 3. The means for rotating the support 2 being irrelevant to my present invention, it is thought to be unnecessary to show or describe any particular means, as it may be driven by any available mechanical power adapted for this purpose. The top wall of the can is formed with a central circular opening 4 and an annular groove 5, the latter being adapted to receive a cap 6, Fig. 4, whereby the cap is held in place over the opening during the operation of soldering it to the can. A copper or equivalent soldering-tool 7 is mounted in a suitable supporting-head 8, said supporting-head being secured to a swinging bracket 9, which is pivoted at 10 to a revolving head 11. This head 11 is journaled in one end of a laterally-projecting supporting-arm 12, which is in turn mounted upon a rocking member 13, whereby the whole attachment, including the soldering-tool 7, the supporting-head 8, and parts connected thereto, may be elevated to permit the can to be moved under the soldering-tool and then depressed during the operation of soldering the cap to the can. The means for effecting this rocking movement forms no part of my present invention—that is, the bar 13 may be rocked by any available mechanism, depending upon the machine to which my improved device is attached, and I therefore thought it unnecessary to show any particular means for rocking the member 13 or even showing any supports therefor. The head 8 is provided with a vertical slot 14, in which the soldering-tool 7 is inserted, and is held in position by a wedge-key 15. This soldering-tool is preferably concavo-convex in cross-section to conform to the curvature of the rim of the cap and preferably consists of a copper bar having a V-shaped edge 16, which is thus found to more readily ride in the annular groove which receives the cap. The wedge 15 forms a convenient means for securing the soldering-tool 7 in place and permits said soldering-tool to be readily adjusted vertically when necessary by simply removing the key and adjusting the tool and then reinserting the key. Projecting laterally from one side of the head 8 is a lug or ear 17, having a lengthwise slot 18, which receives one end of a depending arm 19, the other end being extended downwardly a greater distance than the soldering-tool for forming a stop to engage the periphery of the can, whereby the lower edge of the soldering-tool may be accurately registered with the annular groove of the can or periphery of the cap.

The purpose of slotting the lug or ear 17 laterally is to permit the lateral adjustment of the stop 19 for use in connection with various sizes of cans, said stop being held in its adjusted position by a clamping-nut 20.

I have shown the head 8 and bracket 9 as composed of separate pieces bolted together by a screw 21; but it is evident that these two parts may be integral, if desired.

The object of pivoting the bracket 9 to the head 11 is to permit the head 8 to be rocked or swung upwardly or downwardly to adapt the device for use with cans of various heights, this rocking movement being effected independently of the movement of the bar 13. The means for effecting this vertical adjustment of the head 8 and parts secured thereto independently of the bar 13 preferably consists of a rod 24, an arm 25, and adjusting-nut 26, the lower end of the rod 24 being secured to the head 8 at the rear of the soldering-tool, and its upper end is threaded and passed through a slot 27 in the arm 25 and is engaged by the nut 26, so that by rotating the nut the downward movement of the head 8 is more or less limited, it being understood that when no can is present beneath the soldering-iron the head 8 simply drops until the nut 26 engages the top face of the arm 25. I usually adjust this nut so as to leave a slight loss motion when the soldering-iron is engaged with the can for the purpose of insuring a perfect contact between the soldering-tool and cap of the can.

The head 11 is provided with a threaded stud projecting through an aperture in the outer end of the arm 12, as seen in Fig. 2, and is held in position by a lower shoulder 28 and lock-nuts 29, suitable ball-bearings 30 being interposed between the arm 12 and the adjacent faces of the arm 25 and the shoulder 28.

It is apparent from the foregoing description that the head 8 and the parts connected thereto may be swung laterally upon the arm 12 for the purpose of affording a yielding abutment for the can, the stop 19 being held against the can by means of a spring 31, one end of which is secured to the arm 13, and the other end bears against the lateral face of the head 8.

In order to enable the attendant to properly adjust or center the soldering-tool with reference to the cap without laborious fitting, I provide the arm 12 with a lengthwise slot 33, which receives a clamping-bolt 34, secured to the rock-arm 13, whereby the whole device, exclusive of the arm 12, may be moved forwardly or rearwardly, as may be desired.

It has been previously stated that this attachment is adapted to rock laterally upon the arm 12 and against the action of the spring 31, and in order to limit the movement in one direction I provide the arm 12 with a suitable stop 35, which engages the same side of the arm 25 as the soldering-tool is with reference to the stop 19, so that while the spring 31 actuates the head until the stop 19 engages the side face of the can any further movement is prevented by the stop 35, which is also adjustable laterally, as seen in Fig. 1.

In Fig. 4 I have shown a tube 36, through which the soldering-wire 37 is passed and abuts against the soldering-tool at a point near its contact with the can, any suitable means, not necessary to herein illustrate or describe, being employed to heat the soldering-tool.

Having thus described my invention, what I claim, and desire to secure by Letters Patent, is—

1. An attachment for soldering-machines comprising a support for the soldering-tool, a soldering-tool mounted on the support, a stop also mounted on the support and extending downwardly a greater distance than the soldering-tool, said stop being adjustable laterally toward and from the tool and means to clamp the tool in its adjusted position.

2. In an attachment for soldering-machines, a tilting support, a bar mounted on the support, a head carried by the bar, a soldering-tool on the head, a stop secured to the head for the purpose described, and means for adjusting the head vertically irrespective of the rocking support.

3. In combination with a vertically-tilting arm and actuating means therefor, a head rotatably mounted upon the arm, a tool-supporting head connected to the former head, a soldering-tool secured to the latter head and an adjusting-screw having one end secured to the tool-supporting head and its other end passed through the second arm and provided with an adjusting-nut whereby the tool-supporting head may be raised and lowered irrespective of the tilting movement of the first-named arm.

4. In an attachment for soldering-machines, a support in combination with a vertically-swinging bracket carried by the support and movable independently of the support, a tool-supporting head secured to the bracket, a soldering-tool mounted on the head and means for adjusting the bracket and head vertically independently of the support.

5. An attachment for soldering-machines comprising a support, a tool-supporting head mounted upon the support and adapted to swing laterally, a soldering-tool mounted upon the head and a stop also mounted upon the head and extending downwardly a greater distance than the tool for engaging the side face of the can.

6. An attachment for soldering-machines comprising a support, a tool-supporting head mounted upon the support and adapted to swing laterally, a soldering-tool mounted upon the head and a stop also mounted upon the head and extending downwardly a greater distance than the tool for engaging the side face of the can and a spring for holding the stop against the face of the can.

7. An attachment for soldering-machines comprising a support, a tool-supporting head mounted upon the support and adapted to swing laterally, a soldering-tool mounted upon the head and a stop also mounted upon the head and extending downwardly a greater distance than the tool for engaging the side face of the can and means to adjust the head vertically irrespective of its support.

In witness whereof I have hereunto set my hand this 24th day of March, 1903.

FRANK N. PRINCE.

Witnesses:
S. GRAND,
A. I. MORTON.